United States Patent
Osborn et al.

(10) Patent No.: US 9,856,014 B2
(45) Date of Patent: Jan. 2, 2018

(54) AIRCRAFT WING FAIRING DRIVE ASSEMBLY, SYSTEM, AND METHOD

(71) Applicant: THE BOEING COMPANY, Chicago, IL (US)

(72) Inventors: Matthew James Osborn, Seattle, WA (US); Seiya Sakurai, Seattle, WA (US); Benjamin A. Clark, Bothell, WA (US); Steven C. Penn, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 185 days.

(21) Appl. No.: 14/957,837

(22) Filed: Dec. 3, 2015

(65) Prior Publication Data

US 2017/0158310 A1 Jun. 8, 2017

(51) Int. Cl.

| B64C 9/00 | (2006.01) |
|---|---|
| B64C 9/02 | (2006.01) |
| B64C 9/04 | (2006.01) |
| B64C 9/14 | (2006.01) |
| B64C 9/16 | (2006.01) |

(52) U.S. Cl.
CPC .............. *B64C 9/02* (2013.01); *B64C 9/04* (2013.01); *B64C 9/14* (2013.01); *B64C 9/16* (2013.01)

(58) Field of Classification Search
CPC ..................................... B64C 9/02; B64C 9/04
See application file for complete search history.

(56) References Cited

U.S. PATENT DOCUMENTS

| 4,172,575 | A | | 10/1979 | Cole | |
|---|---|---|---|---|---|
| 4,248,395 | A | * | 2/1981 | Cole | B64C 9/04 244/216 |
| 4,381,093 | A | * | 4/1983 | Rudolph | B64C 9/16 244/216 |
| 4,434,959 | A | | 3/1984 | Rudolph | |
| 4,448,375 | A | | 5/1984 | Herndon | |
| 4,605,187 | A | * | 8/1986 | Stephenson | B64C 9/04 244/216 |
| 2014/0175217 | A1 | | 6/2014 | Ishihara | |
| 2015/0292561 | A1 | * | 10/2015 | McNeil | F16C 23/086 244/213 |

FOREIGN PATENT DOCUMENTS

EP 0081610 6/1983

OTHER PUBLICATIONS

Extended European Search Report for EP 16191800.8-1754, dated May 8, 2017.

* cited by examiner

*Primary Examiner* — Richard G Davis
(74) *Attorney, Agent, or Firm* — Joseph M. Butscher; The Small Patent Law Group, LLC

(57) ABSTRACT

A fairing drive assembly couples a flap assembly of a wing of an aircraft to a fairing of the wing. The fairing drive assembly may include a fairing cam including a first joint and a second joint, and a flap link pivotally coupled to the first joint of the fairing cam and the flap assembly. A fairing drive arm is pivotally coupled to the second joint and the fairing. The fairing cam is configured to rotate upon actuation of the flap assembly and deflect the fairing away from the flap assembly.

18 Claims, 6 Drawing Sheets

AIRCRAFT WING FAIRING DRIVE ASSEMBLY, SYSTEM, AND METHOD

FIELD OF THE DISCLOSURE

Embodiments of the present disclosure generally relate to systems and methods for actuating a fairing of a wing of an aircraft.

BACKGROUND OF THE DISCLOSURE

Various aircraft (such as airplanes) include wings having one or more control surfaces that are used to control flight. A typical wing may include one or more flaps that provide high lift surfaces that may be actuated between retracted and extended positions. In a fully-extended position, a flap interacts with airflow to provide lift to the aircraft. In the retracted position, the flap is configured to minimize or otherwise reduce drag, such as when the aircraft is at a cruising altitude.

Many flaps include fairings. A fairing provides a smooth, aerodynamic outline to the flap support structure and reduces drag during flight. In general, a fairing may cover or otherwise occupy spaces or gaps between certain components of an aircraft wing, reduce drag, and provide an aesthetically-pleasing appearance to the wing.

During operation of the aircraft, when one or more flaps are actuated from a retracted position to an extended position, a known fairing is actuated to an extended position, so as not to interfere with movement of the flap(s). A coupling between the flap(s) and the fairing typically includes a link including one or more springs. However, many known couplings including springs are mechanically complex, and expensive to manufacture. Moreover, the use of the springs increases the weight of the coupling, and therefore the aircraft. Increasing the weight of the aircraft increases the cost of operating the aircraft. That is, a heavier aircraft consumes increased amounts of fuel as compared to a lighter aircraft.

SUMMARY OF THE DISCLOSURE

A need exists for a simple, efficient, and cost-effective link that couples a fairing to one or more flaps of an aircraft.

With those needs in mind, certain embodiments of the present disclosure provide a fairing drive assembly that is configured to couple a fairing of a wing to a flap assembly. The fairing drive assembly may include a fairing cam including a first joint and a second joint. A flap link may be pivotally coupled to the first joint of the fairing cam. The flap link may also be configured to indirectly or directly pivotally couple to the flap assembly. A fairing drive arm may be pivotally coupled to the second joint. The fairing drive arm may also be configured to pivotally couple to the fairing. The fairing cam is configured to rotate upon actuation of the flap assembly and deflect the fairing away from the flap assembly. The fairing drive assembly may be devoid of a spring.

The fairing cam may also include a third joint. The fairing drive assembly may also include a support brace pivotally coupled to the third joint. The support brace may also be configured to pivotally couple to a flap support tension beam. In at least one embodiment, the third joint may include a cam central joint located proximate to an apex of a main body of the fairing cam.

The fairing drive assembly may also include a flap link brace that is pivotally coupled to the first joint. The flap link brace may also be configured to pivotally couple to a flap support tension beam.

In at least one embodiment, the fairing cam may include a main body having a triangular shape. The first joint may include a cam crown joint, while the second joint may include a cam fore joint.

Certain embodiments of the present disclosure provide a wing assembly of an aircraft. The wing assembly may include a fixed main body, a flap assembly moveably secured to the fixed main body between a retracted position and a fully-extended position, a fairing moveably secured to the fixed main body, and a fairing drive assembly coupling the flap assembly to the fairing. The fairing drive assembly may include a fairing cam including a first joint and a second joint, a flap link pivotally coupled to the first joint of the fairing cam. The flap link is also pivotally coupled to the flap assembly. A fairing drive arm is pivotally coupled to the second joint. The fairing drive arm is also pivotally coupled to the fairing. The fairing cam is configured to rotate upon actuation of the flap assembly and deflect the fairing away from the flap assembly in response to the flap assembly moving from the retracted position towards the fully-extension position.

The flap assembly may include at least two flaps. The wing assembly may also include an actuation system secured to a fixed structure within the wing. The actuation system is coupled to the flap assembly. The actuation system is configured to actuate the flap assembly between the retracted position and the fully-extended position.

DETAILED DESCRIPTION OF THE DISCLOSURE

Figure 1:
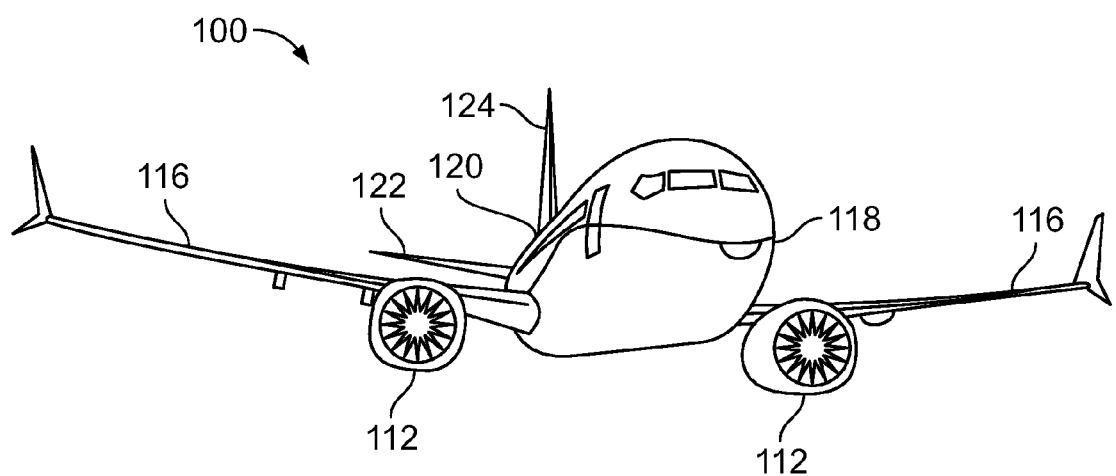
FIG. 1 illustrates a perspective front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a fairing drive assembly that couples a flap assembly of a wing of an aircraft to a fairing. The fairing drive assembly may be secured to an aft end of a flap support link of the wing. The fairing drive assembly is configured to drive an aft end of a fairing out of the way of a range of motion of the flap assembly as the flap assembly moves between a retracted position and a fully-extended position.

Embodiments of the present disclosure provide a fairing drive assembly that may be devoid of a spring (such as a tension spring), thereby reducing cost and weight. The fairing drive assembly is configured to extend the fairing away from the flap assembly while also preventing or otherwise reducing a possibility that the fairing over-travels in a retracted position. As such, the fairing drive assembly minimizes or reduces a possibility of damage to wing components.

Certain embodiments of the present disclosure provide a fairing drive assembly, such as a spring-free aircraft flap and fairing support linkage. The fairing drive assembly may include a fairing cam, which may include three joints. A flap link may pivotally couple a cam crown joint to a main flap carrier beam of a flap support mechanism. A flap link brace may couple the crown joint to a flap support pivot link of the flap support mechanism. A fairing cam support brace may couple a cam central joint to a flap support tension beam of the flap support mechanism. A fairing drive arm may couple a cam fore joint to a fairing. The fairing cam is configured to rotate upon actuation of the main flap carrier beam and deploy the fairing away from the flap support mechanism.

Certain embodiments of the present disclosure provide a fairing drive assembly that may include a fairing cam having three joints. The fairing cam may be pivotally coupled to a flap support assembly at a first joint that is configured to rotate and actuate the fairing cam about a second joint when the flap assembly is extended. A fairing drive arm may be pivotally coupled to a third joint. The fairing drive arm may also be configured to pivotally couple to the fairing. The fairing cam is configured to rotate upon actuation of the flap assembly and deflect the fairing away from the flap assembly. The fairing drive assembly may be devoid of a spring.

FIG. 1 illustrates a perspective front view of an aircraft 100, according to an embodiment of the present disclosure. The aircraft 100 may include a propulsion system that may include two turbofan engines 112, for example. Optionally, the propulsion system may include more engines 112 than shown. The engines 112 are carried by wings 116 of the aircraft 100. In other embodiments, the engines 112 may be carried by a fuselage 118 and/or an empennage 120. The empennage 120 may also support horizontal stabilizers 122 and a vertical stabilizer 124. The wings 116, the horizontal stabilizers 122, and the vertical stabilizer 124 may each include one or more control surfaces.

Each wing 116 may include one or more flaps, which may provide high lift surfaces. Each wing 116 may also include one or more fairings. For example, the flaps and the fairings may be located on and/or within aft end portions of the wings 116.

Figure 2:
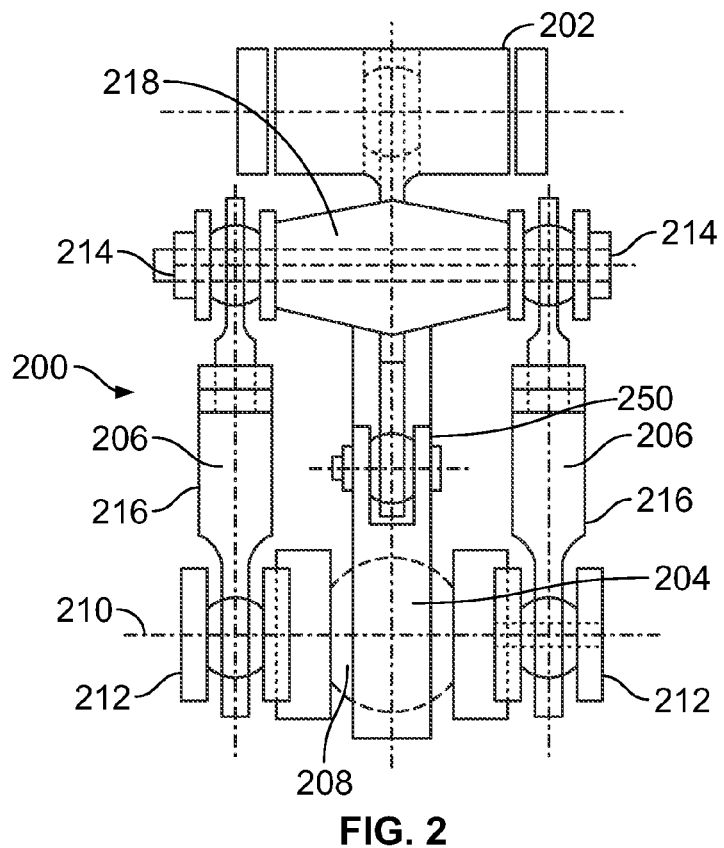
FIG. 2 illustrates a front view of a fairing drive assembly coupled to a flap support mechanism, according to an embodiment of the present disclosure.

FIG. 2 illustrates a front view of a fairing drive assembly 200 coupled to a flap support mechanism 202, according to an embodiment of the present disclosure. The fairing drive assembly 200 and the flap support mechanism 202 may be located at and/or within an aft end of a wing assembly of an aircraft, such as the wing 116 of the aircraft 100, shown in FIG. 1.

Figure 4:
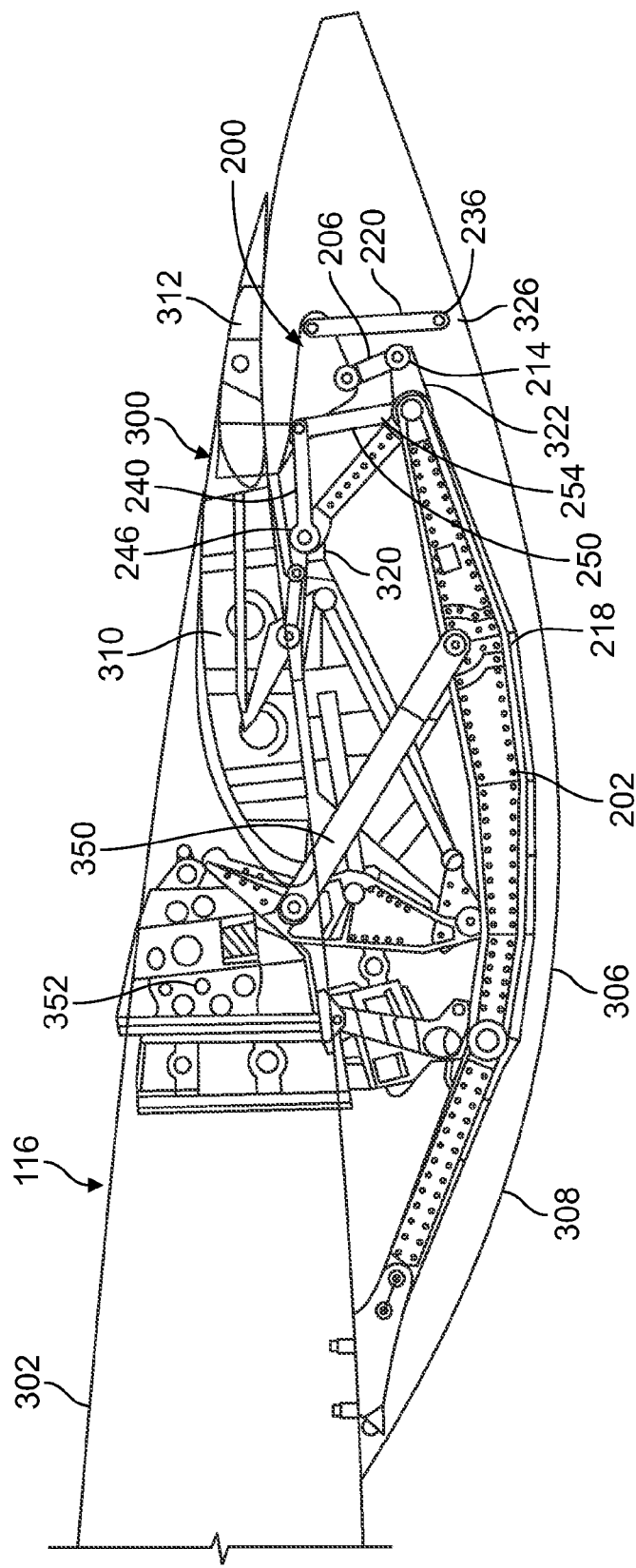
FIG. 4 illustrates a lateral internal view of an aft end of a wing assembly of an aircraft with a flap assembly in a retracted position, according to an embodiment of the present disclosure.

The fairing drive assembly 200 may include a fairing cam 204 pivotally coupled to two fairing cam support braces 206 (referred to as support braces 206) on either side of the fairing cam 204. For example, the fairing cam 204 may include a first joint, such as a cam central joint 208, defining a pivot axis 210. Each support brace 206 may include a cam coupling end 212 that pivotally couples to the cam central joint 208, and is configured to rotate about the pivot axis 210. The cam coupling end 212 connects to a flap support coupling end 214 through an intermediate body 216. The cam coupling end 212 and the intermediate body 216 allow for a vertical adjustment of a fairing 306 (as shown in FIG. 4) relative to a flap assembly and a flap support mechanism. The cam coupling end 212 may be or include a bar, strap, beam, or other such rigid structure, which may be formed of metal, for example. The flap support coupling end 214 pivotally couples to the flap support mechanism 202, such as at a flap support tension beam 218. Optionally, instead of two support braces 206, the fairing drive assembly 200 may include a single support brace 206.

As shown in FIG. 2, the support braces 206 may be configured such that a flap link brace 250 may pass over the flap support coupling end 214 as the fairing drive assembly 200 is actuated into an extended position. As described below, the fairing drive assembly 200 may also include a fairing drive arm (not shown in FIG. 2) having a cam coupling end that pivotally couples to a second joint, such as a cam fore joint, of the fairing cam 204 and a fairing coupling end that couples to a fairing. Additionally, the fairing drive assembly 200 may include a flap link that may pivotally couple a third joint, such as a cam crown joint, of the fairing cam 204 to a main flap carrier beam of a flap assembly.

Figure 3:
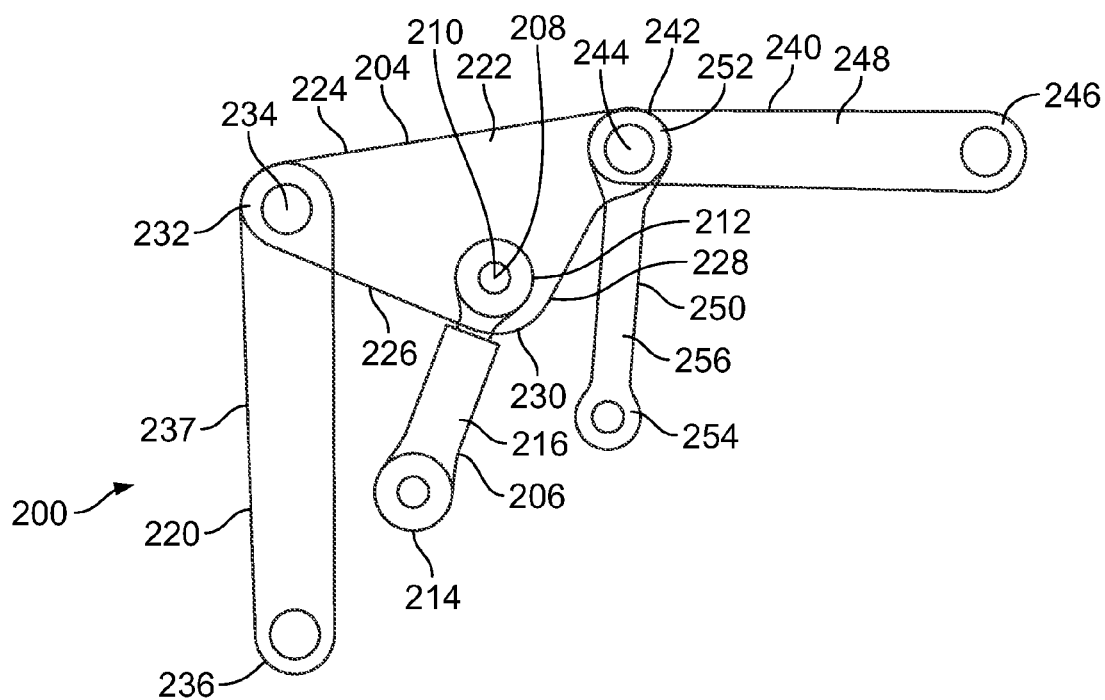
FIG. 3 illustrates a lateral view of a fairing drive assembly, according to an embodiment of the present disclosure.

FIG. 3 illustrates a lateral view of the fairing drive assembly 200, according to an embodiment of the present disclosure. The fairing cam 204 may include a main body 222 that may have a triangular shape, and which may include three pivot joints. The fairing cam 204 may be formed as a metal plate having the three pivot joints, each of which may include a bearing, for example, that is configured to rotatably couple to a reciprocal member at an end of the support brace 206, the fairing drive arm 220, and the flap link, for example, as described below. The main body 222 may include a straight edge 224 connected to an angled edge 226 that in turns connect to trailing edge 228 at an apex 230. The cam central joint 208 may be located proximate to the apex 230 at the union of the angled edge 226 and the trailing edge 228. The support brace 206 includes the cam coupling end 212 that pivotally couples to the cam central joint 208, and is configured to rotate about the pivot axis 210. As noted above, the cam coupling end 212 connects to the flap support coupling end 214 through the intermediate body 216. The flap support coupling end 214 is configured to pivotally couple to a pivotal interface (such as a bearing, axle, and/or the like) of the flap support tension beam 218 (shown in FIG. 2).

The fairing drive arm 220 may include a cam coupling end 232 that pivotally couples to the cam fore joint 234 of the fairing cam 204. The cam fore joint 234 may be located proximate to the union of the straight edge 224 and the angled edge 226. The cam coupling end 232 connects to a fairing coupling end 236 through an extension beam 237. The fairing drive arm 220 may be or include a bar, strap, beam, or other such rigid structure, which may be formed of metal, for example. The cam coupling end 232 and the fairing coupling end 236 are at opposite ends of the extension beam 237. The fairing coupling end 236 is configured to pivotally couple to a fairing, such as through a pivotal interface, which may include a bearing and/or an axle.

As noted, the fairing drive assembly 200 may also include the flap link 240 having a cam coupling end 242 that may pivotally couple to a cam crown joint 244 of the fairing cam 204. The cam crown joint 244 may be proximate to a union of the straight edge 224 and the trailing edge 228 of the fairing cam 204. The cam coupling end 242 of the flap link 240 connects to a flap coupling end 246 through an extension beam 248. The flap link 240 may be or include a bar, strap, beam, or other such rigid structure, which may be formed of metal, for example. The cam coupling end 242 and the flap coupling end 246 are at opposite ends of the extension beam 248. The flap coupling end 246 is configured to pivotally connect to a main flap carrier beam of a flap support mechanism.

The fairing drive assembly 200 may also include a flap link brace 250 having a cam coupling end 252 connected to a flap support coupling 254 through an extension beam 256. The flap link brace 250 may be or include a bar, strap, beam, or other such rigid structure, which may be formed of metal, for example. The cam coupling end 252 and the flap support coupling 254 are at opposite ends of the extension beam 256. The cam coupling end 252 also pivotally connects to the cam crown joint 244, while the flap support coupling 254 is configured to pivotally connect to a portion of the flap support mechanism.

FIG. 4 illustrates a lateral internal view of an aft end of a wing assembly, such as the wing 116 of the aircraft 100 (shown in FIG. 1), with a flap assembly 300 in a retracted position, according to an embodiment of the present disclosure. The wing 116 may include a fixed main body 302 and the flap assembly 300 moveably secured to the fixed main body 302. A fairing 306 may be coupled to the main body 302 and the flap assembly 300. The fairing 306 may be positioned underneath the main body 302 and the flap assembly 300. The fairing 306 may include an aerodynamically-shaped outer surface 308 that covers internal components of the wing 116 and is configured to reduce drag during operation of the aircraft.

The flap assembly 300 may include a main flap 310 and an outer flap 312 that are configured to be actuated outwardly and downwardly in order to provide a lift surface, such as upon takeoff, ascent, descent, and landing. As shown in FIG. 4, the flap assembly 300 is in the retracted position, which reduces drag, and may be used while an aircraft is at a cruising altitude.

The flap support mechanism 202 may be a six bar flap support mechanism that may include the flap support tension beam 218, which is configured to provide support to the flap assembly 300. Optionally, the flap support tension mechanism 202 may have more or less than six bars, such as a four or seven bar flap support structure.

As shown, the fairing drive assembly 200 pivotally couples to the fairing 306 and the flap support mechanism 202. The flap coupling end 246 of the flap link 240 pivotally couples to a main flap carrier beam 320 of the flap support mechanism 202.

The flap support coupling end 214 of the support brace 206 pivotally couples to the flap support tension beam 218 (shown in FIG. 2). For example, the flap support coupling end 214 may pivotally couple to a distal end 322 of the flap support tension beam 218. The fairing coupling end 236 of the fairing drive arm 220 is coupled to a distal portion 326 of the fairing 306. The flap support coupling 254 of the flap link brace 250 pivotally couples to a portion of the flap support tension beam 218 that may be inward from the distal end 322.

Figure 5:
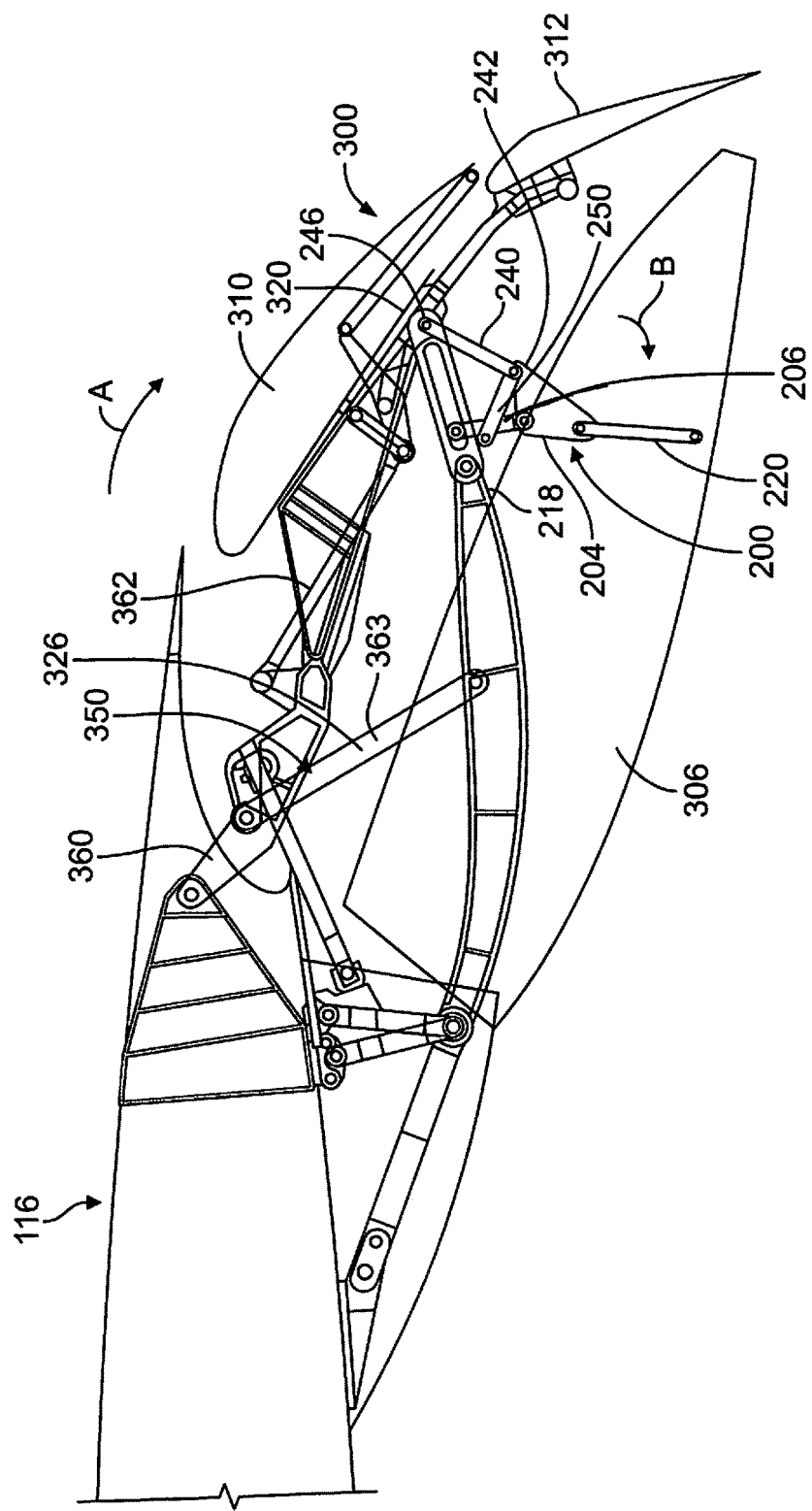
FIG. 5 illustrates a lateral internal view of an aft end of a wing assembly of an aircraft with a flap assembly in a fully-extended position, according to an embodiment of the present disclosure.

The wing 116 may also include an actuation system 350 that is secured to a fixed structure 352 (such as a spar) within the wing 116. The actuation system 350 is configured to actuate the flap assembly 300 between the retracted position shown in FIG. 4 and a fully-extended position, as shown in FIG. 5. During motion of the flap assembly 300, the fairing drive assembly 200 passively (through operation of the actuation system 350) moves the fairing out of a range of motion of the flap assembly 300. As such, the fairing drive assembly 200 ensures that the fairing 306 does not interfere with operation of the flap assembly 300.

FIG. 5 illustrates a lateral internal view of the aft end of the wing 116 of the aircraft 100 (shown in FIG. 1) with the flap assembly 300 in a fully-extended position, according to an embodiment of the present disclosure. Referring to FIGS. 4 and 5, in order to actuate the flap assembly 300 into the fully-extended position, the actuation system 350 includes a link 360 that couples the actuation system 350 to the fixed structure 352. The link 360 couples to a transmission cylinder 362 that extends the flap assembly 300 to a fully-extended position, and a cylinder 363 that couples the link 360 to the flap support tension beam 218. In the fully-extended position, the main flap 310 separates from the outer flap 312. During such motion, the fairing drive assembly 200 rotates about the various pivotal couplings to deflect the fairing 306 down and out of the way of flap assembly 300. As such, throughout an entire range of motion of the flap assembly 300, the fairing drive assembly 200 ensures that the fairing 306 does not contact or otherwise interfere with the flap assembly 300.

As the flap assembly 300 is actuated from the retracted position (shown in FIG. 4) to the fully-extended position (shown in FIG. 5), the fairing cam 204 rotates downwardly. The support brace(s) 206 pivotally rotate in relation to the flap support tension beam 218 and the fairing cam 204. At the same time, the fairing cam 204 may rotate downwardly about the flap link brace 250 (as shown in FIGS. 4 and 5).

The motion of the flap assembly 300 causes the flap link 240 to rotate in a similar direction and pivot with respect to the fairing cam 204. As shown, as the main flap carrier beam 320 is rotated outwardly and downwardly in the direction of arc A, the flap coupling end 246 of the flap link 240 moves outwardly in response thereto, while the cam coupling end 242 may move inwardly and downwardly in the direction of arc B, as it is pivotally coupled to the fairing cam 204. At the same time, the fairing drive arm 220 pivots and extends downwardly and inwardly about the fairing cam 204 to deflect the fairing 306 downwardly away from the flap assembly 300. Accordingly, the fairing drive assembly 200 ensures that the fairing 306 is deflected away from the flap assembly 300 as the flap assembly is actuated between the retracted position (shown in FIG. 4) towards and into the fully-extended position (shown in FIG. 5).

Figure 6:
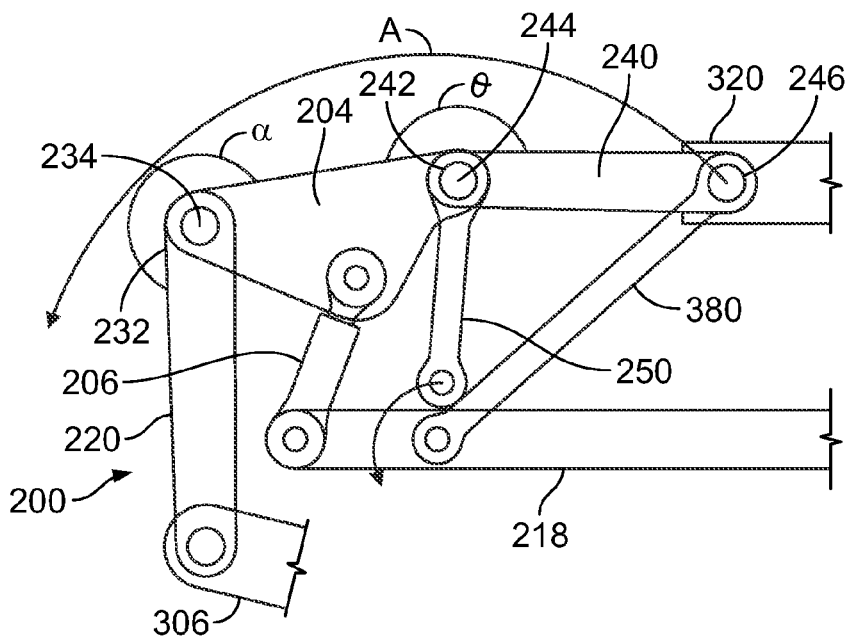
FIG. 6 illustrates a lateral view of a fairing drive assembly in a retracted position coupled to a main flap carrier beam, a flap support tension beam, and a fairing, according to an embodiment of the present disclosure.

FIG. 6 illustrates a lateral view of the fairing drive assembly 200 in a retracted position coupled to the main flap carrier beam 320, the flap support tension beam 218, and the fairing 306, according to an embodiment of the present disclosure. As shown, in the retracted position, the flap link 240 and the fairing cam 204 may almost form a linear alignment. As the flap assembly 300 (shown in FIGS. 4 and 5) is actuated into an extended position in the direction of arc A, the flap coupling end 246 pivots in relation to the main flap carrier beam 320 in the direction of arc A, while the cam coupling end 242 pivots about the cam crown joint 244. In response, the fairing cam 204 pivots downwardly in the direction of arc A, and the fairing drive arm 220 moves in response thereto via the cam coupling end 232 pivoting in relation to the cam fore joint 234. As shown in FIG. 6, the wing may include a flap support pivot linking bar 380 that may pivotally couple the main flap carrier beam 320 to the flap support tension beam 218.

Figure 7:
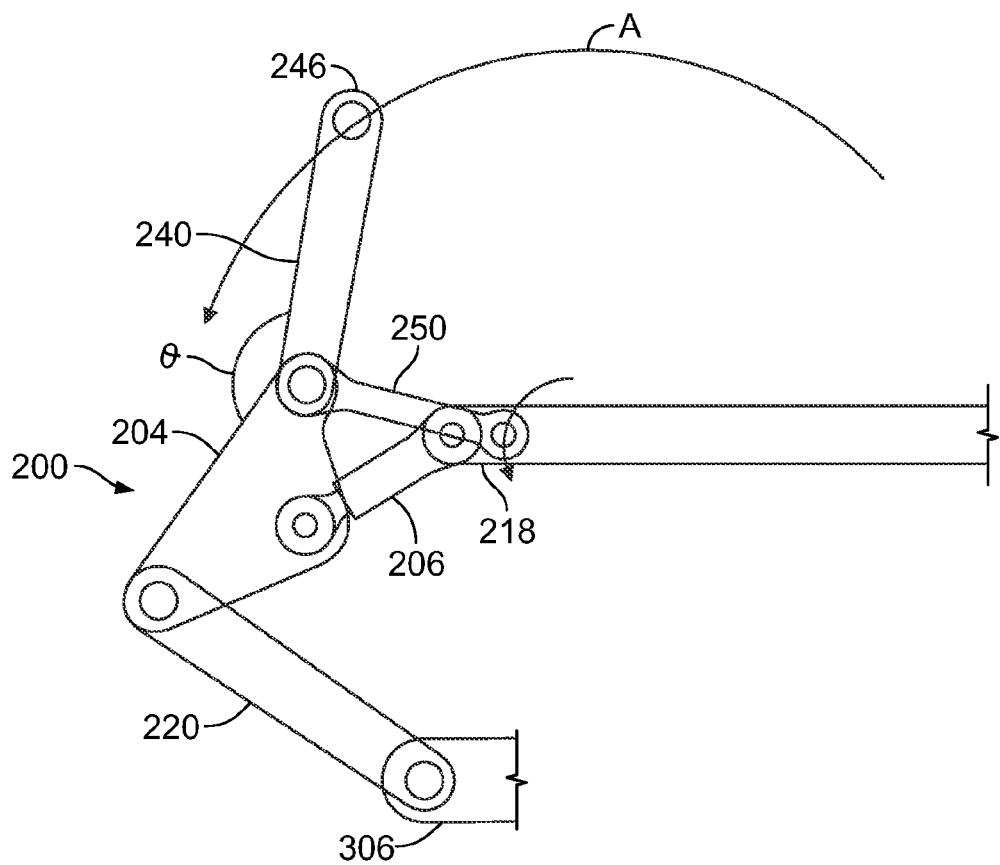
FIG. 7 illustrates a lateral view of a fairing drive assembly in an intermediate position, according to an embodiment of the present disclosure.

FIG. 7 illustrates a lateral view of the fairing drive assembly 200 in an intermediate position, according to an embodiment of the present disclosure. The intermediate position is a position between the retracted position (shown in FIG. 6) and a fully-extended position (shown in FIG. 8). As the flap coupling end 246 of the flap link 240 is pivoted up and out in the direction of arc A, the coupling between the cam coupling end 242 and the cam crown joint 244 pivotally rotates and moves the fairing cam 204, such that an angle θ is formed between outer edges of the flap link 240 and the fairing cam 204. The angle θ is less in the intermediate position than in the retracted position (in which the angle θ is closer to 180 degrees). During the motion of the fairing drive assembly 200 in the direction of arc A toward the fully-extended position, the fairing drive arm 220 pivots the fairing 306 downwardly and outwardly away from the flap assembly 300 (shown in FIGS. 4 and 5, for example). At the same time, the support brace(s) 206 and the flap link brace 250 bracingly and pivotally support the fairing cam 204 in relation to the flap support tension beam 218, to ensure that the fairing cam 204 (or any other portion of the fairing drive assembly 200) does not collapse onto the flap support tension beam 218 (which may otherwise cause damage to the fairing drive assembly 200 and/or the flap support tension beam 218).

Figure 8:
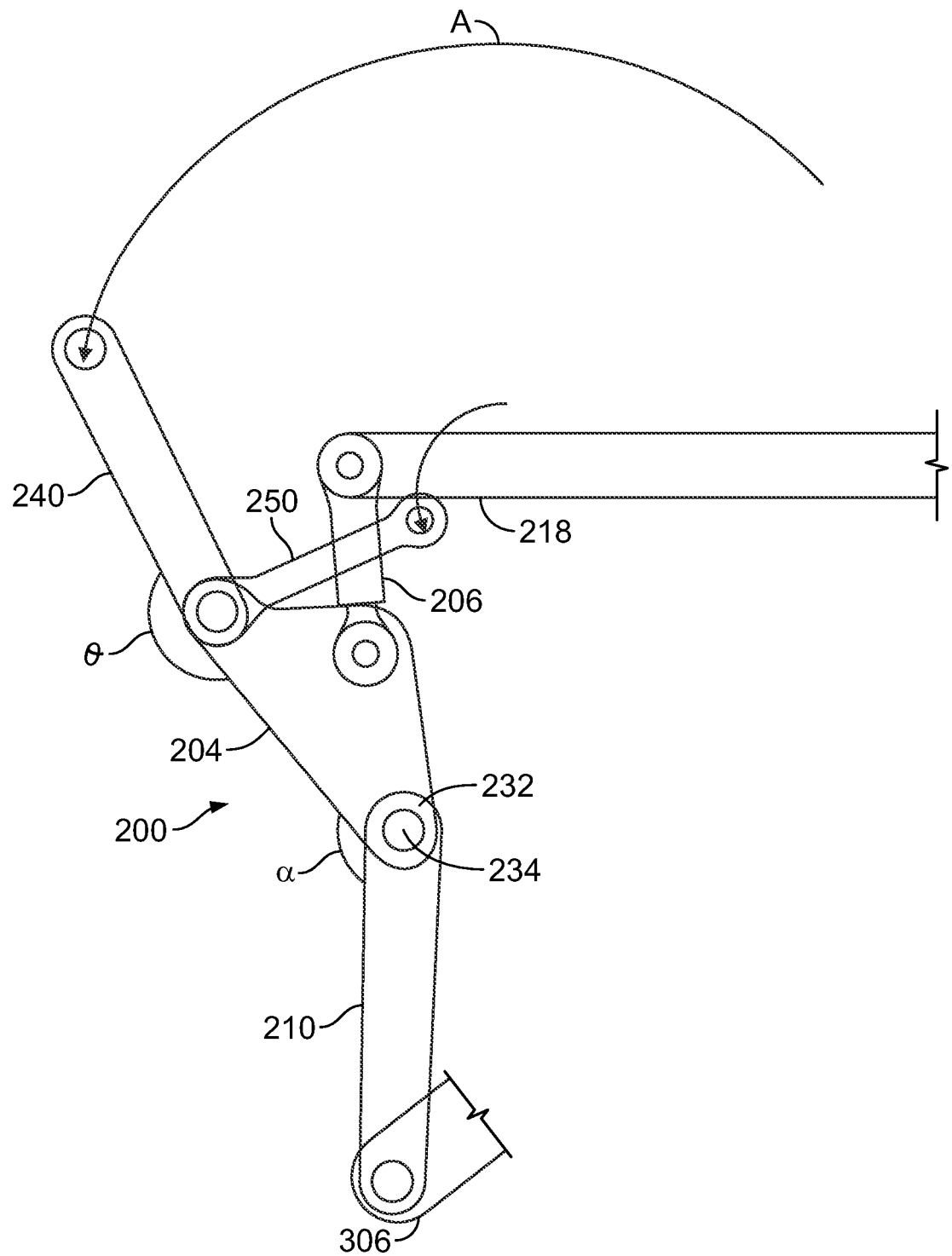
FIG. 8 illustrates a lateral view of a fairing drive assembly in a fully-extended position, according to an embodiment of the present disclosure.

FIG. 8 illustrates a lateral view of the fairing drive assembly 200 in the fully-extended position, according to an embodiment of the present disclosure. As shown, in the fully-extended position, the fairing drive arm 220 may downwardly extend from the fairing cam 204 in a vertical position. The cam coupling end 232 of the fairing drive arm 220 pivots downwardly about the cam fore joint 234 to push the fairing 306 down and away, such as in relation to the flap assembly 300 (shown in FIGS. 4 and 5). An angle α between outer edge surfaces (for example, the edge surfaces that are distally located from the flap support tension beam 218) of the fairing drive arm 220 and the fairing cam 204 may be less in the fully-extended position than in the retracted position. For example, as shown in FIG. 6, the angle α may be approximately 270 degrees. In contrast, as shown in FIG. 8, the angle α may be approximately 135 degrees.

Further, the angle θ between the outer edge surfaces (for example, the surfaces that are distally located from the flap support tension beam 218) of the fairing cam 204 and the flap link 240 shown in FIGS. 6 and 8 may be similar, such as approximately 180 degrees. In contrast, the angle θ in the intermediate position, as shown in FIG. 7, may be less than in the retracted and fully-extended positions. For example, the angle θ in the intermediate position may be approximately 150 degrees.

Referring to FIGS. 1-8, embodiments of the present disclosure provide a fairing drive assembly that may pivotally couple a fairing to a flap assembly of a wing of an aircraft. The fairing drive assembly may be quickly, efficiently, and economically manufactured with a relatively small number of parts. For example, the fairing drive assembly may include a fairing cam pivotally coupled to a flap link and a fairing drive arm. The fairing drive assembly may also include one or more of a support brace and a flap link brace. The fairing drive assembly may be devoid of a spring, such as a tension spring.

Embodiments of the present disclosure provide a simple, efficient, and cost-effective link that couples a fairing to one or more flaps of an aircraft. Further, embodiments of the present disclosure provide a relatively light link that that is configured to couple a fairing to one or more flaps of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A fairing drive assembly that is configured to couple a flap assembly of a wing of an aircraft to a fairing of the wing, the fairing drive assembly comprising:
   a fairing cam including a first joint a second joint, and a third joint, wherein the first joint and the second joint are separated by a first linear distance, wherein the first joint and the third joint are separated by a second linear distance, wherein the second joint and the third joint are separated by a third linear distance, and wherein the first linear distance is greater than each of the second linear distance and the third linear distance;
   a flap link pivotally coupled to the first joint of the fairing cam;
   a fairing drive arm pivotally coupled to the second joint, wherein the fairing drive arm is also configured to be pivotally coupled to the fairing; and
   a support brace pivotally coupled to the third joint and a flap support tension beam,
   wherein the fairing cam is configured to rotate upon actuation of the flap assembly and deflect the fairing away from the flap assembly.

2. The fairing drive assembly of claim 1, wherein the third joint is a cam central joint located proximate to an apex of a main body of the fairing cam.

3. The fairing drive assembly of claim 1, further comprising a flap link brace that is pivotally coupled to the first joint, and wherein the flap link brace is also configured to be pivotally coupled to a flap support tension beam.

4. The fairing drive assembly of claim 1, wherein the fairing drive assembly is devoid of a spring.

5. The fairing drive assembly of claim 1, wherein the fairing cam comprises a main body having a triangular shape.

6. The fairing drive assembly of claim 1, wherein the first joint is a cam crown joint.

7. The fairing drive assembly of claim 1, wherein the second joint is a cam fore joint.

8. A wing assembly of an aircraft, the wing assembly comprising:
   a fixed main body;
   a flap assembly moveably secured to the fixed main body between a retracted position and a fully-extended position;
   a fairing moveably secured to the fixed main body; and
   a fairing drive assembly coupling the flap assembly to the fairing, the fairing drive assembly comprising:
      a fairing cam including a first joint a second joint, and a third joint, wherein the first joint and the second joint are separated by a first linear distance, wherein the first joint and the third joint are separated by a second linear distance, wherein the second joint and the third joint are separated by a third linear distance, and wherein the first linear distance is greater than each of the second linear distance and the third linear distance;
      a flap link pivotally coupled to the first joint of the fairing cam;
      a fairing drive arm pivotally coupled to the second joint, wherein the fairing drive arm is also pivotally coupled to the fairing; and
      a support brace pivotally coupled to the third joint and a flap support tension beam,
      wherein the fairing cam is configured to rotate upon actuation of the flap assembly and deflect the fairing away from the flap assembly in response to the flap assembly moving from the retracted position towards the fully-extension position.

9. The wing assembly of claim 8, wherein the third joint comprises a cam central joint located proximate to an apex of a main body of the fairing cam.

10. The wing assembly of claim 8, further comprising a flap link brace that is pivotally coupled to the first joint, and wherein the flap link brace is also pivotally coupled to a flap support tension beam.

11. The wing assembly of claim 8, wherein the fairing drive assembly is devoid of a spring.

12. The wing assembly of claim 8, wherein the fairing cam comprises a main body having a triangular shape.

13. The wing assembly of claim 8, wherein the first joint is a cam crown joint.

14. The wing assembly of claim 8, wherein the second joint is a cam fore joint.

15. The wing assembly of claim 8, wherein the flap assembly comprises at least two flaps.

16. The wing assembly of claim 8, further comprising an actuation system secured to a fixed structure within the wing, wherein the actuation system is coupled to the flap assembly, and wherein the actuation system is configured to actuate the flap assembly between the retracted position and the fully-extended position.

17. A wing assembly of an aircraft, the wing assembly comprising:
   a fixed main body;
   a flap assembly moveably secured to the fixed main body between a retracted position and a fully-extended position, wherein the flap assembly comprises at least two flaps;
   an actuation system secured to a fixed structure within the wing, wherein the actuation system is coupled to the flap assembly, wherein the actuation system is configured to actuate the flap assembly between the retracted position and the fully-extended position;
   a fairing moveably secured to the fixed main body; and
   a fairing drive assembly that is devoid of a spring and couples the flap assembly to the fairing, the fairing drive assembly comprising:
      a fairing cam comprising a main body having a triangular shape, wherein the main body includes a first joint, a second joint, and a third joint;
      a flap link pivotally coupled to the first joint of the fairing cam;
      a fairing drive arm pivotally coupled to the second joint, wherein the fairing drive arm is also pivotally coupled to the fairing;
      a support brace pivotally coupled to the third joint, and wherein the support brace is also pivotally coupled to a flap support tension beam of a flap support structure extending from the fixed main body of the wing; and
      a flap link brace that is pivotally coupled to the first joint, and wherein the flap link brace is also pivotally coupled to the flap support tension beam,
      wherein the fairing cam is configured to rotate upon actuation of the flap assembly and deflect the fairing away from the flap assembly in response to the flap assembly moving from the retracted position towards the fully-extension position.

18. The wing assembly of claim 17, wherein the first joint comprises a cam crown joint, wherein the second joint comprises a cam fore joint, and wherein the third joint comprises a cam central joint located proximate to an apex of a main body of the fairing cam.

* * * * *